United States Patent [19]
Johnson et al.

[11] 3,771,249
[45] Nov. 13, 1973

[54] ELECTRIC ANTI-SHARK DART

[76] Inventors: Clarence S. Johnson, San Diego, Calif.; Henry D. Baldridge, Sarasota, Fla.

[22] Filed: Sept. 4, 1969

[21] Appl. No.: 855,233

[52] U.S. Cl. .............................. 43/6, 273/106.5 R
[51] Int. Cl. ...................... A01k 81/06, F41b 15/04
[58] Field of Search ................ 273/106.5, 84; 43/6, 43/17.1; 124/1; 128/404, 303.18, 405; 42/84; 102/46

[56] References Cited
UNITED STATES PATENTS

| 8,843 | 3/1852 | Sounenburg et al. ...... 128/303.18 X |
| 2,805,067 | 9/1957 | Ryan .............................. 273/106.5 |
| 3,090,151 | 5/1963 | Stewart et al. ........... 273/106.5 R X |
| 3,484,665 | 12/1969 | Mountjoy et al. ..................... 43/6 X |
| 3,523,538 | 8/1970 | Shimizu .............................. 43/6 X |

*Primary Examiner*—Richard C. Pinkham
*Assistant Examiner*—Paul E. Shapiro
*Attorney*—Justin P. Dunlavey, Ervin F. Johnston and Thomas G. Keough

[57] ABSTRACT

A cylindrically-shaped casing is releasably carried on a spear shaft and houses a source of electric power delivering either a DC or an AC signal to an outwardly extending blade-shaped electrode at one end, and to a plug-shaped electrode on the casing's opposite end. Upon launching the spear shaft and embedding the blade electrode into a shark or similar marine predator, a concentrically-disposed sleeve mounting a magnet is longitudinally displaced along the casing to actuate a magnet-operated reed switch carried within the casing. In an alternative embodiment a pair of spring-biased contacts are substituted for the reed switch. The contacts extend through the casing and are electrically isolated from each other and the surrounding sea water by a removable insulating cap. An electric current, provided by the source of electric power, passes in a completed circuit from the plug-shaped electrode, through the surrounding seawater, into the shark's body and returns via the blade-shaped electrode. When sufficient current is present, an involuntary muscular reaction is induced in capacitating the shark without creating noise or bloodying the water that often attracts other sharks.

2 Claims, 4 Drawing Figures

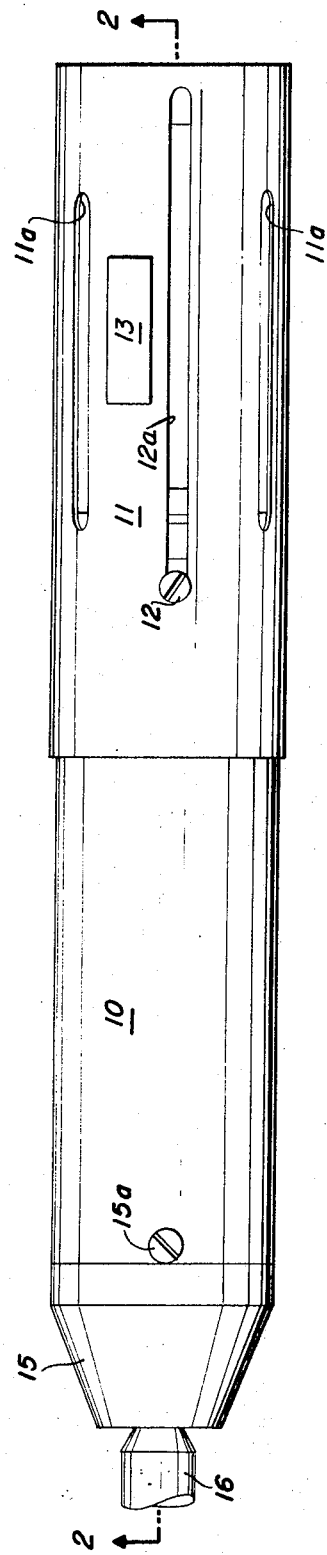
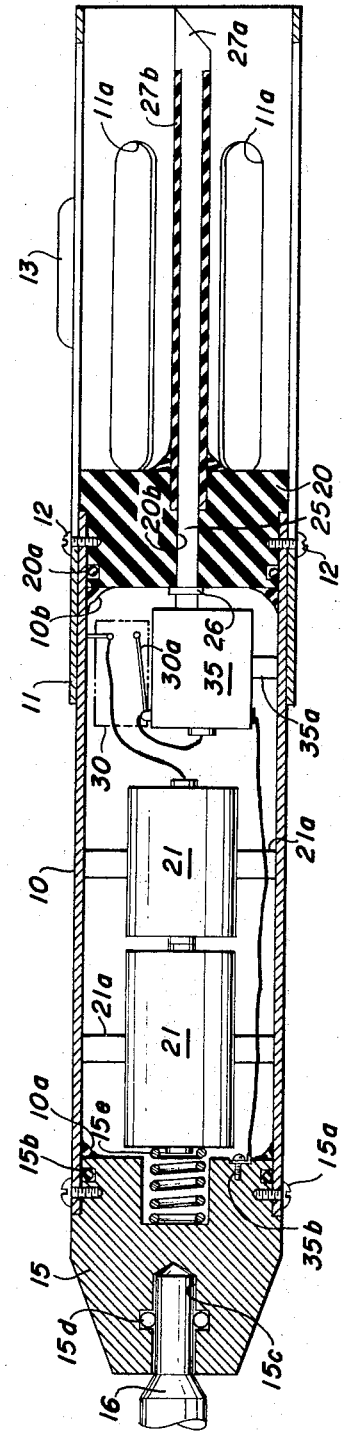
FIG. 1
FIG. 2
INVENTORS
CLARENCE S. JOHNSON
BY HENRY D. BALDRIDGE
Thomas G. Keough
Ervin F. Johnston
ATTORNEYS

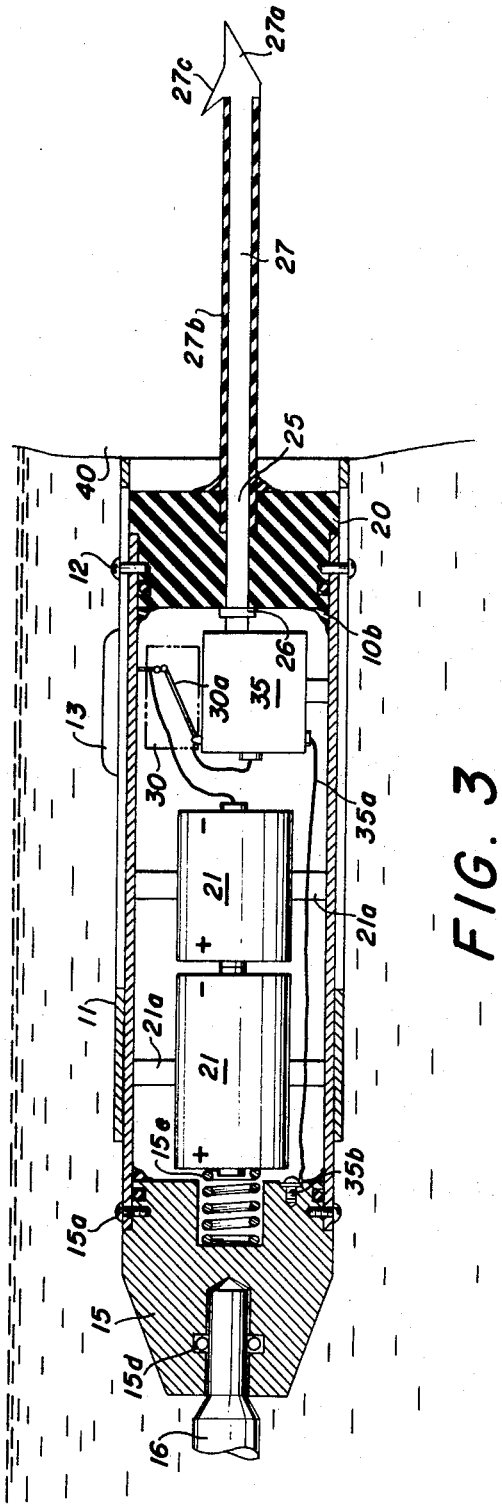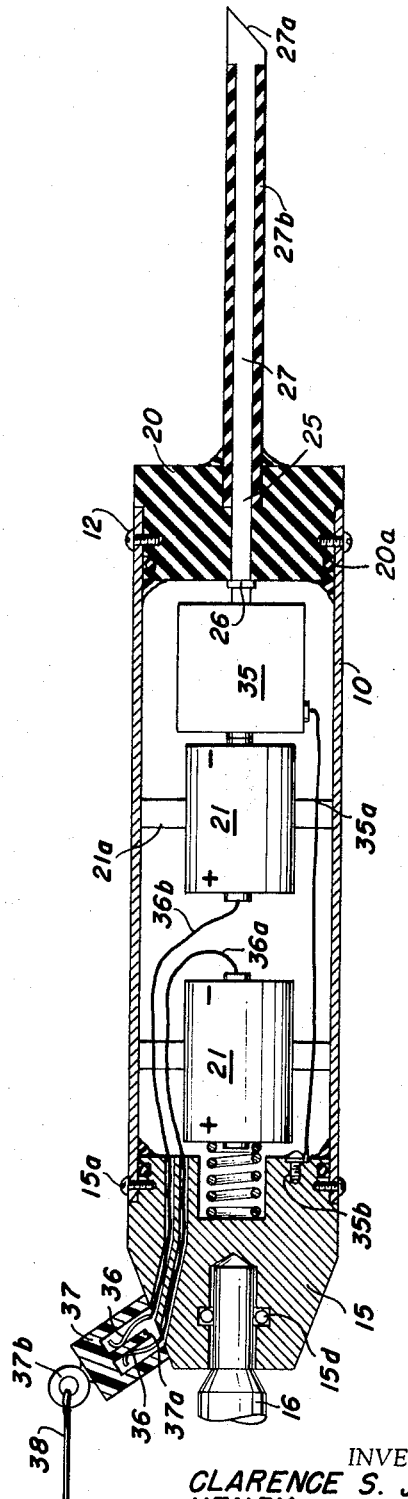

ELECTRIC ANTI-SHARK DART

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Present methods of dealing with or neutralizing large marine predators, especially sharks, are largely unsatisfactory or inadequate. Conventional spear guns and sea lances pose little protection from a menacing shark, since this fish has a high threshold of pain and, because of its small brain, it is extremely difficult to kill. Explosive power heads afford some degree of diver protection; however, the power head must be accurately delivered to the brain area of a shark. Thus, using a power head necessitates a diver's being in close proximity to the shark, and also subjects a diver to the defening concussion produced by the exploding power head and the danger of being hit by the recoiling spear shaft. Long range neutralization of a shark has been attempted by spear guns delivering incapacitating drugs. Since most of these drugs affect the shark's nervous system, a time lapse occurs before the drugs take effect, during which time the shark could inflict severe injuries. However, as with power heads, considerable risk is taken by the diver because of the inherently lethal nature of the drug solutions. Employing cattle prod-like shock sticks are unsatisfactory for these require the close proximity of the diver to the shark and in some cases have attracted the shark rather than repelled it. In addition, some of these shock sticks have output voltages of such a magnitude to make these devices prohibitively hazardous to the user.

SUMMARY OF THE INVENTION

The present invention is directed to providing an electric, self-contained dart for incapacitating a marine predator, such as a shark. The dart is formed of a casing having, at one end, an externally-conductive plug, and, at the other end, an oppositely extending blade element configured to permit its insertion in the shark. Within the casing, a source of low-voltage electrical power provides a current capable of incapacitating a shark by inducing an involuntary muscular reaction. A switch, carried within the casing, is actuated when the blade is embedded in the shark to complete a circuit that passes the current from the plug, through the seawater, through the shark's body, and to the blade-shaped electrode. Having the plug detachably mounted on a spear gun shaft or a sea lance permits a relatively long range deployment of the dart with minimal diver exposure to the shark.

The prime object of the invention is to provide a self-contained dart for incapacitating a marine predator.

Another object of the invention is to provide a dart capable of effecting the immediate, yet continuous, incapacitation of a shark.

A further object is to provide a compact dart that is quiet and acts immediately to neutralize a menacing shark.

Yet another object is to provide an electric self-contained dart operable at low potentials to minimize the risk of inadvertently injuring a diver.

Still another object is to provide an effective anti-shark dart capable of incapacitating a shark irrespective of the point of insertion in a fleshy part of a shark's body.

A further object is to provide an anti-shark dart capable of prolonged or limited incapacitation of a shark.

An ultimate object of the invention is to provide a small, compact unit capable of long range deployment to ensure increased diver's safety.

These and other objects of the instant invention will become readily apparent from a detailed examination of the ensuing description when taken with the drawings.

BRIEF DESCRIPTION OF THE DRAWINGS

FIG. 1 is a side view of the invention.

FIG. 2 is a sectional view generally taken along lines 2—2 in FIG. 1.

FIG. 3 is a sectional view showing the invention in operative engagement.

FIG. 4 is a sectional side view of a second embodiment of the invention.

DESCRIPTION OF THE PREFERRED EMBODIMENTS

Referring now to the drawings, a preferred form of the self-contained electric anti-shark dart is shown in two embodiments, both being equally suitable for immobilizing a hostile marine predatory animal, such as the shark. A dart is that portion of a spear gun assembly that is commonly referred to as the point and is carried on the furthermost extension of a spear shaft or a lance. The instant invention, depicted in representative dimensions, is less than ten inches in overall length, is less than one inch in diameter, and is formed of a cylindrically-shaped casing 10, preferably constructed of a lightweight, strong, nonconductive material. Increase or reduction in size is governed by the materials on hand and the size of the shark.

One end of the casing is closed by a plug of conductive material, such as copper or brass 15, and is secured by a plurality of screws 15a. The plug is provided with an annular recess mounting an appropriate seal 15b, and an axial bore 15c is fitted with a retainer ring 15d frictionally engaging the outermost extension of a spear gun shaft or lance shaft 16. Being removably mounted on a shaft, allows the withdrawal of the shaft while the dart remains in the body of the shark to immobilize it while a diver attends to other tasks or uses his spear gun for other purposes.

Oppositely facing the axial bore, the conductive plug is shaped with a cavity mounting a conductive biasing spring 15e extending to the casing's interior.

Concentrically disposed on the cylindrically shaped casing, the tubular sleeve 11 is carried in a slidable relationship by means of a plurality of screws 12 anchored in the casing, with each individually extending through a separate, elongate slot 12a. The shafts of the screws fit freely within their respective slots and the heads of the screws clear the outermost surface of the sleeve to permit a reciprocal, longitudinal motion, the purpose of which will be set out below.

Formed within the tubular sleeve, are a plurality of openings 11a, thusly disposed to permit a free passage of water to minimize the forward and lateral drag effects as the dart is maneuvered and fired under water.

In a first embodiment of the invention, set forth in FIGS. 1, 2, and 3, a switching magnet 13 is bonded, or otherwise affixed, to the outer surface of the sleeve, and consists of a well-known, high permeability alloy capable of inducing a substantially strong magnetic field through nonconductive casing 10.

Closing the opposite end of the casing, an insulating plug of bakelite, or a similar nonconductive compound, 20, is secured by screws 12 and is shaped with an annular recess housing an O-ring 20a for sealing the interior of the casing from the surrounding water. The plug is additionally provided with an axial bore 20b through which an elongate conductor member 25 extends.

The elongate conductor communicates with the interior of the casing in an inner terminal element 26 that is electrically continuous with an externally projecting blade member 27. The blade member projects from the outer face of the insulating plug a distance equal to, or less than, the length of the tubular sleeve when it is axially extended to its furthermost extension from the casing, see FIG. 2, to prevent inadvertent injury to a diver. The blade member is shaped with a sharpened tip 27a of the same or similar conductive material as the elongate conductor and is additionally provided with a longitudinal nonconductive, insulating sheath 27b. A barb 27c is optionally included to ensure retention of an embedded blade in a shark's body and also facilitates seperation of spear shaft 16 from the dart by providing a withdrawal resistant force to overcome the drag produced by retaining ring 15d.

Within the casing, at least one battery 21 is connected with one pole electrically contacting conductive biasing spring 15e, and the opposite pole terminating in a schematically represented, magnet-operated reed switch 30. A magnetically displaceable swing arm 30a is connected to an electronic black box 35 that functions to provide either a DC current path, a DC to AC inverter at a preselected frequency, or to provide intermittent bursts of high frequency power to inner terminal 26 as required by the job at hand. Electronic circuits capable of performing these three functions are well known within the state of the art and elaboration on specific circuits employed is felt unnecessary.

The embodiment depicted in FIGS. 1, 2, and 3 delivers an incapacitating current to a shark as follows. FIG. 2 shows a dart in its inactive mode, that is to say, there is no current passing through the dart since the contacts in magnet-operated reed switch 30 are open and break a complete circuit. Upon propelling the dart against a shark, the externally projecting blade member penetrates deeply into a fleshy portion of the shark's body 40. As the blade continues to move inward, the tubular sleeve is arrested from forward motion and is pushed along the casing, contiguously covering a greater part of the casing to bring switching magnet 13 to a position substantially adjacent magnet-operated reed switch 30. The magnetic field acting on magnetically displaceable reed arm 30a pulls the contacts within the switch together and completes a circuit within the dart. Externally, the circuit is completed as current passes from conductive plug 15, through the surrounding seawater, through the shark's body and to innermost conductive tip 27a of the embedded blade member. The paths the current takes within the shark's body pass through a variety of internal passageways depending upon the area where the blade member is embedded, generating heat while so doing.

In a typical example demonstrating the invention's efficient performance, the dart was modified to include an inverter as black box 35 to deliver 10 watts of power to conductive plug 15 and externally projecting blade member 27, at 25 volts RMS at a frequency of 60 Hertz. A 12-foot 450 pound tigershark, having this modified dart embedded in any fleshy portion of its body was completely paralyzed immediately. The shark remained in this state for over three minutes, at which time the electric anti-shark dart was removed and the shark recovered. Using DC voltages, similar results were observed, however high DC voltages, up to 90 volts were necessary to produce the total paralysis observed at 25 volts RMS at 60 Hertz. A DC voltage of as little of 9 volts was observed to paralyze smaller sharks or at least cause an aversion response.

In all cases evolving either a total paralysis or an aversion response, the area where the dart is embedded is not critical, the only requirement being that a sufficient fleshy area be hit to enable penetration and retention of the blade member. In all cases the paralysis or aversion response is instantaneous with no noise or convulsive thrashing as is the case when drug injecting weapons are used. The considerable concussion attendant a power head's employment also is not present, which noise has been known to attract other sharks as well as possibly injuring a diver's hearing.

In a second embodiment depicted in FIG. 4, magnet-operated reed switch 30 is replaced by a pair of spring-biased contacts 36 serially interposed in the battery-black box circuit via a pair of insulated leads 36a and 36b. Opposed one's of the contacts are externally mounted on conductive plug 15 in an electrically insulated relationship and a sealing cap 37, also constructed of an electrically insulating material, is glued onto the plug sealing the two contacts from surrounding seawater to prevent short circuiting the contacts. A separating wall 37a is included within the sealing cap for holding the contacts apart to electrically isolate each from the other and a ring 37b, carried on the sealing cap, receives a trigger line 38 extending to a spear gun or diver.

Tabular sleeve 11 optionally is eliminated in the embodiment of FIG. 4 since one of its prime purposes is to serve as a movable support for switching magnet 13, which is in this embodiment, not required. However, if it is desired to have the tubular sleeve as a safety device, its inclusion with the second embodiment is made as a matter of choice. Other elements are substantially identical to those described in the first embodiment.

Upon embedding externally-projecting blade member 27 in the shark's body, the trigger line is pulled by the diver, or automatically, as the spear gun is fired and the shaft leaves the gun. Separating wall 37a is pulled from between spring-biased opposed contacts 36, and the contacts, upon snapping together, complete the circuit formed of the battery, black box, conductive plug member, seawater, shark's body, and blade member, as disclosed above.

In the embodiments referred to, electronic circuitry contained within the box 35 is shown with a lead 35a being grounded at point 35b. Obviously, the circuitry and methods of switching are meant to illustrate only one of many possible circuit interconnections within the state of the art. Additional protection from internal short-circuiting by water is obtained by coating the inner surfaces of casing 10 with rubberized compound prior to insertion of conductive plug 15 and insulating plug 20. Inserting the plugs wipes the coated rubberized compound from the casing walls to build up annular insulating seals 10a and 10b to supplement the sealing action of seals 15b and 20a.

Laterally reaching mounting brackets 21a and 35a, shown to internally secure the batteries and black box and the interior of the casing is filled with a material having the buoyant, noncompressive properties of a material such as syntactic foam. Thusly filled, the anti-shark dart is pressure resistant and less prone to fail when carried to great depths.

Having the interior evacuated or foam-filled, offsets excessive negative buoyancy caused by the batteries and black box to ensure accurate long range deployment of the anti-shark dart when vicious marine predators are encountered.

Obviously, many modifications and variations of the present invention are possible in the light of the above teachings, and, it is therefore understood that within the scope of the disclosed inventive concept, the invention may be practiced otherwise than as specifically described.

What is claimed is:

1. A self-contained dart for incapacitating a marine predator comprising:

a tubularly-shaped casing formed with a cavity and an externally communicating electrically conductive portion sealing one end of said casing and shaped to releasably engage a spear shaft for long range deployment and further formed with a tubular sleeve concentrically disposed about and slidably displaceable along said casing from an extended position to a retracted position;

a conductor member mounted on an insulator block sealing the opposite end of said casing electrically insulated from said conductive portion and having an inner terminal disposed in said cavity and an externally reaching elongate blade element substantially enclosed in an electrically insulating sheath having an exposed tip ensuring the passing of an incapacitating current deep within the body of said marine predator and configured to permit its penetration and retention in the fleshy portion of said body;

at least one battery providing said current for incapacitating said predator disposed within said cavity connected to provide an internal coupling between said conductive portion and said conductor member; and switching means in the form of a magnet-operated reed switch carried in said cavity and a switching magnet secured to said sleeve disposed for actuating said switch to complete a circuit passing said current from said conductive portion, through surrounding water, through said fleshy portion to said exposed tip causing an incapacitating involuntary reaction thereto, upon embedding said blade member in said marine predator.

2. A self-contained dart for incapacitating a marine predator comprising:

a tubularly-shaped casing formed with a cavity and an externally communicating electrically conductive portion sealing one end of said casing and shaped to releasably engage a spear for long range deployment;

a conductor member mounted on an insulator block sealing the opposite end of said casing electrically insulated from said conductive portion and having an inner terminal disposed in said cavity and an externally reaching elongate blade element substantially enclosed in an electrically insulating sheath having an exposed tip ensuring the passing of an incapacitating current deep within the body of said marine predator and configured to permit its penetration and retention in the fleshy portion of said body;

at least one battery providing said current for incapacitating said predator disposed within said cavity connected to provide an internal coupling between said conductive portion and said conductor member; and switching means in the form of a pair of spring-biased contacts extending through said casing separated and electrically isolated by an insulating cap upon the removal thereof enabling the transfer of said current said conductive portion, through surrounding water, through said fleshy portion to said exposed tip causing an incapacitating involuntary reaction thereto, upon embedding said blade member in said marine predator.

* * * * *